US007315548B2

(12) United States Patent
Joshi

(10) Patent No.: US 7,315,548 B2
(45) Date of Patent: Jan. 1, 2008

(54) METHOD AND APPARATUS FOR DETERMINING A ROUTE BETWEEN A SOURCE NODE AND A DESTINATION NODE IN A WIRELESS MULTIHOPPING COMMUNICATION NETWORK

(75) Inventor: Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 11/403,245

(22) Filed: Apr. 13, 2006

(65) Prior Publication Data

US 2006/0187893 A1    Aug. 24, 2006

Related U.S. Application Data

(63) Continuation of application No. 10/863,710, filed on Jun. 7, 2004, now Pat. No. 7,061,925.

(60) Provisional application No. 60/476,236, filed on Jun. 6, 2003.

(51) Int. Cl.
*H04L 12/28* (2006.01)
(52) U.S. Cl. .................................... 370/401
(58) Field of Classification Search ............... 370/310, 370/328–338, 347, 351, 400, 401, 428; 709/230, 709/238–244; 455/403, 422, 445
See application file for complete search history.

(56) References Cited

U.S. PATENT DOCUMENTS

| 5,363,369 | A | * | 11/1994 | Hemmady et al. | 370/392 |
|---|---|---|---|---|---|
| 5,490,139 | A | * | 2/1996 | Baker et al. | 370/312 |
| 5,495,479 | A | * | 2/1996 | Galaand et al. | 370/404 |
| 5,654,959 | A | * | 8/1997 | Baker et al. | 370/331 |
| 6,377,990 | B1 | * | 4/2002 | Slemmer et al. | 709/225 |
| 6,480,508 | B1 | * | 11/2002 | Mwikalo et al. | 370/475 |
| 6,487,600 | B1 | * | 11/2002 | Lynch | 709/229 |
| 6,584,102 | B1 | * | 6/2003 | Lu | 370/389 |
| 6,597,684 | B1 | * | 7/2003 | Gulati et al. | 370/351 |
| 2004/0156345 | A1 | * | 8/2004 | Steer et al. | 370/338 |

* cited by examiner

*Primary Examiner*—Dmitry Levitan
(74) *Attorney, Agent, or Firm*—Randi L. Karpinia

(57) ABSTRACT

A system and method for controlling the dissemination of Routing packets, and decreasing the latency in finding routes between nodes. The system and method provides message exchanges between wireless devices to determine optimized communication routes with a minimum of overhead messages and buffered data. Exchanged messages are reduced to a specific series of exchanges indicating destination, destination node detection, and route, preferably using a series of IAP devices. Routes are discovered in an efficient manner and latency in finding routes between nodes is reduced, thereby reducing buffered information levels at individual devices.

25 Claims, 2 Drawing Sheets

An Example Network

An Example Network

METHOD AND APPARATUS FOR DETERMINING A ROUTE BETWEEN A SOURCE NODE AND A DESTINATION NODE IN A WIRELESS MULTIHOPPING COMMUNICATION NETWORK

This application is a continuation of prior application Ser. No. 10/863,710, filed Jun. 7, 2004, now U.S. Pat. No. 7,061,925 which claims benefit under 35 U.S.C. § 119(e) from U.S. Provisional Patent Application Ser. No. 60/476,236, filed on Jun. 6, 2003, the entire content of each being incorporated herein by reference.

BACKGROUND OF THE INVENTION

1. Field of the Invention

The present invention relates to a system and method for improving the system performance of a wireless communication network by controlling the dissemination of Routing packets, and decreasing the latency in finding routes between nodes. Specifically, the present invention provides a system and method of message exchanges to determine optimized communication routes with a minimum of overhead messages and buffered data.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

As can be appreciated by one skilled in the art, since certain nodes of the ad-hoc network are mobile, it is necessary for the network to maintain connectivity with those nodes. Transmitted data packets typically "hop" from mobile device to mobile device, creating a transmission path, or route, until reaching a final destination. However, transmission paths between mobile devices are often subject to change as device creating a transmitted path , or route , until reaching a final destination. However, transmission paths between mobile devices are often subject to change as devices move, therefore ad-hoc network communication must be able to adapt to achieve optimum performance while addressing the limited capabilities and capacities of mobile individual devices.

Wireless networks frequently use On-Demand protocols (e.g. ad-hoc on demand distance vector (AODV),(RFC 3561), dynamic source routing (DSR) (Internet Draft), and so forth, as the routing protocol in such communications. This type of routing protocol creates routes only when desired by the source node. When a node requires a route to a destination, it initiates a route discovery process within the network. This process is completed once a route is found or all possible route permutations have been examined. Once a route has been established, it is maintained by some form of route maintenance procedure until either the destination becomes inaccessible along every path from the source, or until the route is no longer desired.

Typically the Route Discovery involves broadcasting and forwarding Route Request (RREQ) packets until the route is found. All the application packets generated in the mean time are buffered at the source node. There can be a large latency associated with this route discovery if the destination is several hops away. This latency can be very large, particularly if an expanding ring search technique is used as is done in AODV. Transceivers typically used in these networks are memory constrained and hence a big latency can force them to drop packets from the buffer. The large latency can also be unsuitable for some applications especially the ones which use transmission control protocol (TCP).

The other drawback of the discovery process is the number of routing packets it generates/forwards during the process. These networks can span in large areas and such broadcasting and forwarding can tremendously increase the latency as well as the overhead. This overhead is even worse if the destination node does not even exist in the network, and in this case, the source node keeps repeating the discovery process and flooding the network in vain.

Accordingly, a need exists for a system and method to discover routes to a destination in an efficient way and also decrease the latency involved in finding the route.

SUMMARY OF THE INVENTION

An object of the present invention is to provide a system and method for message exchanges to determine optimized communication routes with a minimum of overhead messages and buffered data.

Another object of the present invention is to provide a system and method for controlling a sending node to attempt to locate a route without intelligent access point (IAP) assistance if a detected neighbor node is a destination.

Another object of the present invention is to provide a system and method for controlling a sending node to buffer packets while exchanging messages with an IAP seeking route assistance to prevent using an un-optimal route.

Another object of the present invention is to provide a system and method for controlling a sending node to attempt to locate a route without IAP assistance, and thereafter exchange messages with an IAP seeking route assistance.

Another object of the present invention is to provide a system and method for controlling a sending node to exchange a variety of non-specific messages with an IAP seeking route assistance to prevent using an un-optimal route.

These and other objects are substantially achieved by providing a system and method for controlling the dissemination of Routing packets between nodes during route detection. By reducing exchanged messages to a specific series of exchanges indicating destination, destination node detection, and route, preferably using a series of IAP devices, routes are discovered in an efficient manner and latency in finding routes between nodes is reduced. Reducing such latency thereby reduces buffered information levels at individual devices, at least due to route selection.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiments of the present invention described below improves the system performance of a wireless network by controlling the dissemination of Routing packets and decreasing the latency in finding routes. In doing so, each embodiment serves to eliminate the need to keep large buffers in each Subscriber Device (SD).

As noted above, wireless networks frequently use On-Demand protocols (e.g. AODV (RFC 3561), DSR (Internet Draft), and so forth) as the routing protocol. Typically the Route Discovery involves broadcasting and forwarding of RREQ packets until the route is found. All the application packets generated in the mean time are buffered at the source node and there typically is a large latency associated with this route discovery if the destination is several hops away. The embodiments described below include a system and method to discover the routes to the destination in an efficient way and also decrease the latency involved in finding the route.

As described in related U.S. Provisional Patent Application Ser. No. 60/439,449 entitled "System And Method For Achieving Continuous Connectivity To An Access Point Or Gateway In A Wireless Network Following An On-Demand Routing Protocol", filed Jan. 13, 2003, in U.S. Provisional Patent Application Ser. No. 60/439,455 entitled "System And Method For Modifying AODV To Facilitate Smooth Handoffs And Eliminate Unidirectional Links In A Wireless Network", filed Jan. 13, 2003, and in U.S. patent application Ser. No. 10/755,346, entitled "System And Method For Achieving Continuous Connectivity To An Access Point Or Gateway In A Wireless Network Following An On-Demand Routing Protocol, And To Perform Smooth Handoff of Mobile Terminals Between Fixed Terminals In The Network", filed Jan. 13, 2004, the entire content of each being incorporated herein by reference, nodes typically maintain the route to their associated IAP, and the IAP also maintains the route to all the nodes which are associated with the IAP.

An IAP in such a system is assumed to have connectivity with other IAP devices through a back bone or some other kind of link, such that the IAP can forward the packet for an SD to the IAP with which the SD is associated. An example is shown in FIG. 1.

Figure 1:
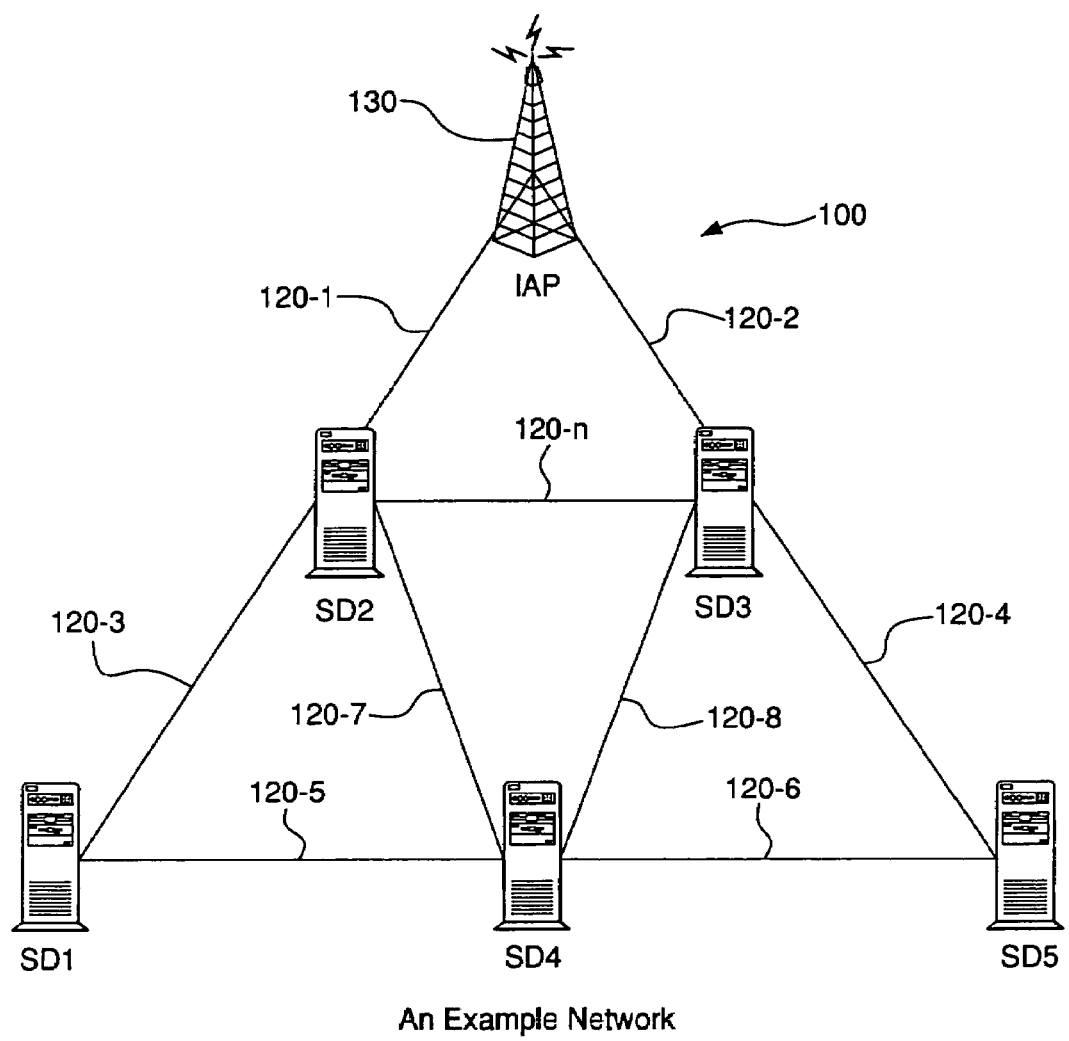
FIG. 1 is a conceptual block diagram illustrating an example of the connections within an ad-hoc network in a first position employing a system and method according to an embodiment of the present invention.
Figure 2:
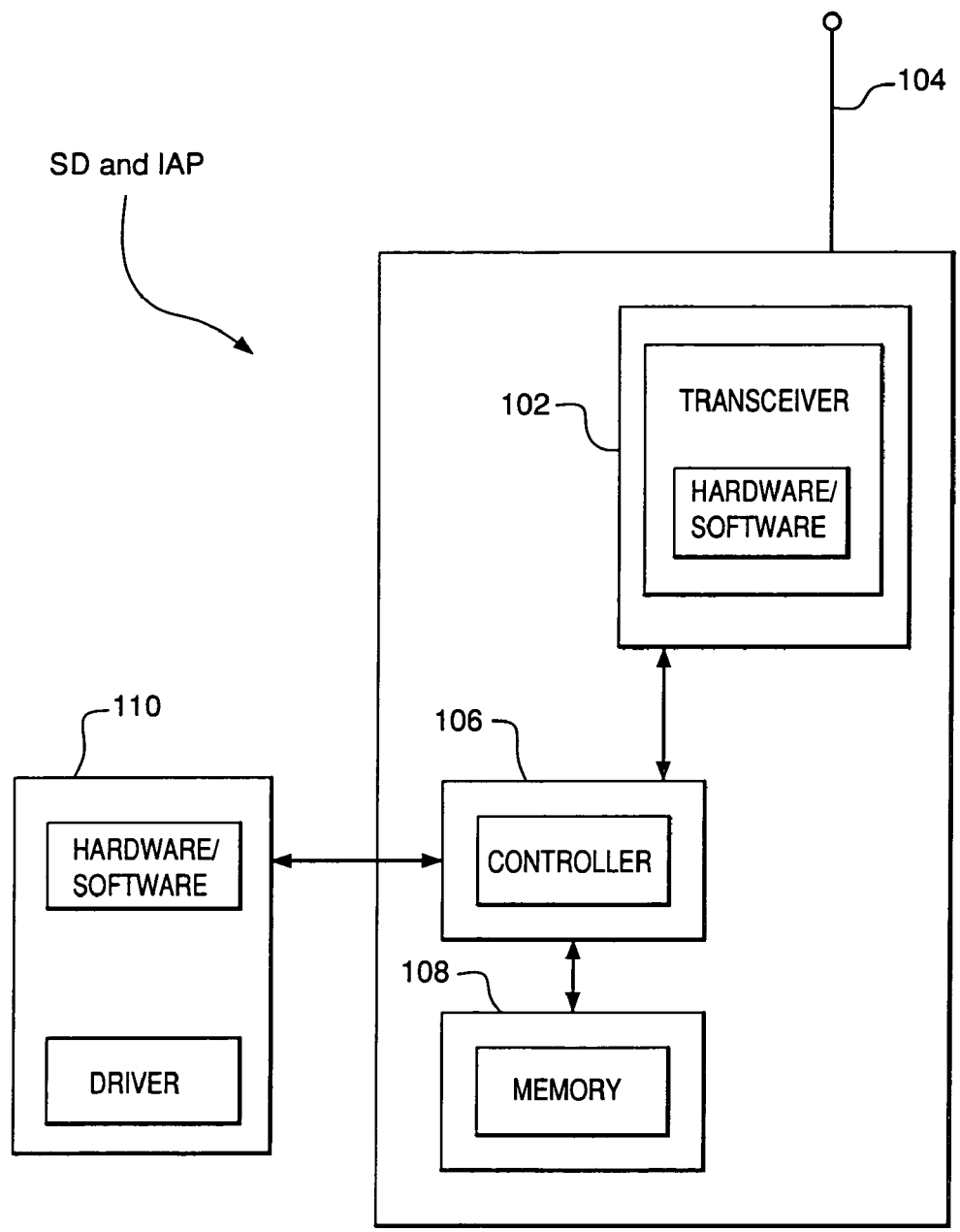
FIG. 2 is a block diagram of an example of a wireless node as shown in FIG. 1.

FIG. 1 is a conceptual block diagram illustrating an example of the connections within an ad-hoc network in a first position employing a system and method according to an embodiment of the present invention. In FIG. 1, a network 100 is shown including Subscriber Devices SD 1 to SD 5 (referred to generally as SD),IAP Devices IAP 130 (referred to generally as IAP), and a series of communication links 120. FIG. 2 is a block diagram of an example of a Subscriber Device SD and IAP, as shown in FIG. 1.

As can be appreciated by one skilled in the art, the SD and IAP are each capable of communicating with each other directly, or via one or more other nodes operating as routers for packets being sent between nodes, as described in U.S. Pat. No. 5,943,322 to Mayor, and in U.S. Pat. Nos. 7,072,650, 6,807,165, and 6,873,839 referenced above. As shown in FIG. 2, each SD and IAP can include a transceiver 102 which is coupled to an antenna 104 and is capable of receiving and transmitting signals, such as packetized signals, to and from the SD and IAP, under the control of a controller 106. The packetized data signals can include, for example, voice, data or multimedia information, and packetized control signals, including node routing and update information.

Each SD and IAP can further include a memory 108, such as a random access memory (RAM), that is capable of storing, among other things, routing information pertaining to itself and other nodes in the network. The SD and IAP can periodically exchange respective routing information, referred to as routing advertisements, with each other via a broadcasting mechanism at various intervals, such as when a new node enters the network, or when existing nodes in the network move.

As further shown in FIG. 2, certain nodes can include a host 110 which may consist of any number of devices, such as a notebook computer terminal, mobile telephone unit, mobile data unit, or any other suitable device. Each SD and IAP can also include the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software protocols to perform automatic repeat request (ARQ) functions and media access control (MAC), including a local dissemination protocol in accordance with the embodiments of the present invention described below.

An IAP can either use an address resolution protocol-reverse address resolution protocol (ARP-RARP) mechanism or routing to find out about the particular IAP with which the destination is associated and hence can forward to it. The other IAP is then responsible to forward it to the destination. For the example below, it is also assumed here that the IAP can know if the node does not even exist in the network. This knowledge of the routes maintained by an IAP is used by the embodiments as described below.

When a data packet is sent from the host to the transceiver, the transceiver determines whether the destination is inside the mesh-network, or outside the mesh-network. If the destination is outside the network (e.g, on the World Wide Web) then the packet should be sent to the IAP. Since the protocol is proactively maintaining the route to the associated IAP, this transmission is achieved without any buffering/latency. If it is determined that the destination is inside the network an effort is made to find the best route to the destination. If the route to the destination is present in the routing table and is valid, the packet is forwarded to the next hop towards the destination. If no route is present, the packet is forwarded to the associated IAP and a special message called Status Request is sent to the IAP that contains the destination address.

Upon receiving this Status Request, the associated IAP consults its routing table to see if the node is present in its routing table. As described before, an IAP should have a route to all the nodes which are associated with it. An IAP can also have some routes to some other nodes which are not associated with it. If a route is present, the associated IAP sends back a special message called Status Reply with a success bit set, otherwise Status Reply is sent with the success bit unset.

Upon receiving the Status Reply with success bit set, the SD initiates an expanding ring search, as described in AODV, for the destination with maximum time to live (TTL) equal to the number of hops to the IAP. In this example, the maximum TTL can also be a function of the number of hops to the IAP or something else. A route can be determined when the RREQ reaches the destination either itself or via an intermediate node with a 'fresh enough' route to the destination. A 'fresh enough' route is a valid route entry for the destination whose associated sequence number is at least as great as that contained in the RREQ. The route is made available by unicasting a Route Reply (RREP) back to the origination of the RREQ. Each node receiving the request caches a route back to the originator of the request, so that the RREP can be unicast from the destination along a path to that originator, or likewise from any intermediate node that is able to satisfy the request.

Upon receiving the RREP the source node updates its routing table and starts using the newly found route. In doing so, the flooding of the Route Request packet is stopped at the IAP level and hence never goes out of control. This significantly reduces the overhead as such networks can span in large areas. This also eliminates the possibility of doing a network-wide Route Discovery, which can lead to heavy overhead, for a destination node which does not even exist in the network.

The source node keeps on sending packets to the IAP while the IAP is waiting for the Status Reply or Status Error message. Thus no packets are buffered in the transceiver of SD. If the Status Reply comes with status bit unset, the node keeps on sending packets to the associated IAP unless the IAP receives a special message called Status Error. The events which can lead to such a message are described below.

The IAP that contains the destination address upon receiving the Status Request message probes the routing table in the transceiver to find if it has a wireless route to the destination. If the probe is unsuccessful, the IAP tries to locate the IAP with which the destination is associated. This can be a route look up in the routing table of the IAP host or an ARP cache look up, or employ some other suitable method. If the IAP determines that it cannot find the IAP with which the destination is associated and hence cannot forward the packet, it generates the Status Error message to the source node.

The possible contents of the messages described above can include, but are not limited to, the following.

Status Request packet
 1. Address of the source node
 2. Address of the destination node
 3. Find Bit (described below)

Status Reply packet
 1. Address of the source node
 2. Address of the destination node
 3. Status bit
 4. Found bit (described below)

Status Error packet
 1. Address of the IAP sending the error message
 2. Address of the source node
 3. Address of the destination node The same information can also be conveyed through any other messages which are flowing between the devices. Even if the transceiver cannot determine whether the destination is inside the mesh-network or outside, it should use the Status Request and Status Reply method as described above to find the route.

There can be several variations to the preferred embodiment of the system and method of the present invention. In a network following an "on demand" protocol, it is possible to have a neighbor entry for a neighboring node in the neighbor table but no route entry for it in the routing table. This can be due to several reasons, such as having a non valid sequence number of the neighbor.

Therefore in a first variation, the node knows that the destination node is a neighbor, but it still will have to find a route for it. In such a case, before initiating the Status Request message to the IAP and starting to send packets to the IAP, it is preferable to send an RREQ for the destination. This RREQ can be either broadcast or unicast.

In case of broadcast, the RREQ should not be forwarded by any other node. If a Route Reply is received then there is no need to go through the process described above. If no Route Reply is received, which can happen due to wrong neighboring information, movement or power loss, then the node can either follow the above process or declare the destination as unreachable for the time being and try again later. Therefore, there can be several variations in the approach followed.

In a second variation, in place of sending the Status Request message and data packet to the IAP simultaneously, the source node can also buffer the packets while waiting for the Status Reply or Status Error. This way no packets will be sent over the temporary un-optimal route. The following example explains this in greater detail.

In the network 100 shown in FIG. 1, the lines 120-1 to 120-*n* represent the connectivity among SD and IAP devices, thus SD 1 is neighbor of SD 2 and SD 4. For the example below, SD 1 is the source node and SD 5 is the destination node, however, any number of node configurations can exist within the network 100. For this example, it is assumed that all the SD devices (SD 1 to SD 5) are associated with the IAP 1. For this example, it is also assumed that SD 1 uses SD 2 to reach the IAP while SD 5 uses SD 3 to reach the IAP and the IAP uses the reverse route to reach SD 1 and SD 5. In one communication example in the network 100 of FIG. 1, as soon as the application starts generating the packet for communication from SD 1 to SD 5, the transceiver of SD 1 will start sending the packets to the IAP, and will also issue a Status Request message. The IAP will in turn forward the packet to the SD 5 and reply with Status Reply message with status bit set. This way the packets will travel through an un-optimal route of 4 hops (i.e. SD 1, to SD 2, to IAP, to SD 3, and to SD 5) until the local Route Discovery process is completed by node SD 1, when it is most likely to get the 2 hop route through SD 4 (i.e. SD 1, to SD 4, and to SD 5).

Thus the second variation, by not sending the packets to the IAP while waiting for Status Reply or Status Error, avoids the usage of this temporary un-optimal route (i.e. SD 1, to SD 2, to IAP, to SD 3, and to SD 5). However, the second embodiment will delay the sending of packets which might be undesirable for some applications, and will also need large buffer space in the transceiver of SD 1.

In a third variation, the node can first do a local Route Discovery before sending the packets to the IAP, or sending any Status Request message. In this variation the source node will first do a local Route Discovery process for the destination. For example, the source node can do an expanding ring search with the maximum TTL equal to the number of hops to the IAP. The maximum TTL can also be a function of the number of hops to the IAP or something else. If the node receives a Route Reply message, the node then starts sending the packets to the destination. If no reply is received after one or more attempts, the node can safely determine that the destination node is not in its vicinity, determined by the maximum TTL it has used.

At this point the node typically has to use the IAP to send the packets to the destination. This can be achieved through the following two techniques.

In a first technique, the node can start sending packets to the IAP once the node determines that the local Route Discovery has failed. The node will stop only if a Status Error message is received from the IAP indicating that the destination node does not exist in the network currently.

In a second technique, the node can send a special message to the IAP or the Status Request message with the find bit set to find if the destination node exists in the network. The IAP upon receiving the message can query its host routing table or ARP cache, or employ some other suitable method, to find the IAP with which the destination node is associated with. If the IAP is successful in finding the IAP with which the destination node is associated, and hence the destination node itself, the IAP indicates this by sending a Status Reply message with the found bit set. Otherwise the IAP sends a Status Error message.

If a Status Reply message is received by the source node with the found bit set, then the node starts sending the packets to the IAP for the IAP to forward to the appropriate IAP with which the destination node is associated. If the Status Error message is received, then the node can declare the destination as unreachable for the time being and try again later. Again in the third variation, latency is involved in finding the route, and packets also need to be buffered.

In a fourth variation, in place of using special messages like Status Request, Status Reply, and Status Error, the nodes can use other messages to convey the same information. For example, the node generally needs to send DNS and/or ARP queries to the associated IAP to find out about the IP address, MAC address, and so forth. The associated IAP upon receiving such messages can send a special kind of message to indicate if the destination node is associated with that IAP or not, or if the destination node does not even exist in the network. The ARP on the domain name system (DNS) replies can also be changed to contain this information. This way the Status messages will not be needed. As noted above, there can be several ways to discover such information.

The variations of the present invention described above provide several advantages. There is a low latency associated with finding routes, and no buffering of packets is needed at the transceiver of the SD. Low routing overhead is required, as Route Discovery process is initiated only if it is known that the destination exists in the neighborhood. Also, the present invention increases the scalability of the network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining a route between a node in a wireless multihopping communication network and a destination, the method comprising:

determining, by the node, whether the destination is within the network;

sending, by the node, a packet for delivery to an intelligent access point of the network with which the node is associated, for further delivery to the destination, when the node determines that the destination is outside the network;

when the node determines that the destination is within the network, locating within a routing table, by the node, an existing route to the destination, and if the node cannot locate the existing route to the destination, further attempting, by the node, to obtain information pertaining to the route to the destination from the intelligent access point;

when the node obtains the information from the intelligent access point, determining, based on the information, whether to further attempt to locate the route; and when the node determines it will further attempt to locate the route, attempting, by the node, to locate the route by performing an expanded ring search using a maximum time to live (TTL) being a function of a number of hops between the node and the intelligent access point.

2. A method as claimed in claim 1, further comprising:

when the node is able to locate a route to the destination, sending, by the node, the packet for delivery to the destination via the route in which the node located.

3. A method as claimed in claim 1, further comprising:

when the node locates the route based on the information, sending, by the node, the packet for delivery to the destination via the route.

4. A method as claimed in claim 1, further comprising:

when the node is unable to locate the route based on the information, sending, by the node, the packet for delivery to the intelligent access point for further delivery to the destination.

5. A method as claimed in claim 1, further comprising:
sending the packet to the intelligent access point, and continuing to send one or more packets to the intelligent access point, while locating the route to the destination by the node.

6. A method as claimed in claim 1, further comprising:
refraining from sending the packet to the intelligent access point while locating the route to the destination by the node.

7. A method as claimed in claim 1, wherein:
attempting, by the node, to obtain the information pertaining to the route to the destination from the intelligent access point further comprises sending, by the node, one of an address resolution protocol (ARP) message and a domain name system (DNS) message to the intelligent access point and awaiting from the intelligent access point a reply that is one of an ARP reply message and a DNS reply message.

8. A method as claimed in claim 1, further comprising:
sending, by the intelligent access point, a status error message for receipt by the node when the intelligent access point is unable to locate the route to the destination after the node has attempted to obtain information pertaining to the route from the intelligent access point.

9. A method as claimed in claim 1, further comprising:
sending, by the node, a route request to attempt to locate the route to the destination when the node determines that the destination is a neighboring node within the network.

10. A method as claimed in claim 9, further comprising:
refraining, by the node, from sending a status request message for receipt by the intelligent access point while the node attempts to locate the route to the destination using the route request.

11. A method as claimed in claim 1, wherein:
attempting to obtain the information pertaining to the route from the intelligent access point further comprises sending, by the node, a status request message to the intelligent access point, and buffering the packet while awaiting receipt of a status reply or status error message from the intelligent access point in response to the status request message.

12. A method as claimed in claim 1, further comprising:
refraining, by the node, from sending a status request message to the intelligent access point while locating the route to the destination.

13. A node operating within a wireless multihopping communication network to send a packet to a destination, the node comprising:
a transceiver; and
a controller, operatively coupled to the transceiver, the controller programmed to:
  determine whether the destination is within the network,
  when the destination is determined to not be within the network, controlling the transceiver of the node to send a packet for delivery to an intelligent access point of the network with which the node is associated, for further delivery to the destination, and
  when the destination is determined to be within the network, controlling the node to locate within a routing table an existing route to the destination, and if an existing route to the destination cannot be located, controlling the node to attempt to obtain information pertaining to a route to the destination from the intelligent access point, and when the node obtains the information from the intelligent access point, controlling the node to determine, based on the information, whether to further attempt to locate the route, and when the node determines it will further attempt to locate the route, controlling the node to locate the route by performing an expanded ring search using a maximum time to live (TTL) being a function of a number of hops between the node and the intelligent access point.

14. A node as claimed in claim 13, wherein:
the controller further controls the transceiver of the node to send the packet for delivery to the destination via the route in which the node located.

15. A node as claimed in claim 13, wherein:
the controller is further programmed to attempt to locate the route when the node obtains the information from the intelligent access point.

16. A node as claimed in claim 13, wherein:
the controller further controls the transceiver of the node to send the packet for delivery to the destination via the route determined based on the information.

17. A node as claimed in claim 13, wherein:
the controller further controls the transceiver of the node to send the packet for delivery to the intelligent access point for further delivery to the destination when the node is unable to locate the route based on the information.

18. A node as claimed in claim 13, wherein:
the controller further controls the transceiver of the node to send the packet to the intelligent access point, and to continue to send packets to the intelligent access point, while attempting to locate the route to the destination.

19. A node as claimed in claim 13, wherein:
the controller further controls the transceiver of the node to refrain from sending the packet to the intelligent access point while operating the node to locate the route to the destination.

20. A node as claimed in claim 13, wherein:
the controller further controls the node to attempt to obtain the information pertaining to the route to the destination from the intelligent access point by controlling the transceiver of the node to send one of an address resolution protocol (ARP) message and a domain name system (DNS) message to the intelligent access point and await from the intelligent access point a reply that is one of an ARP reply message and a DNS reply message.

21. A node as claimed in claim 13, wherein:
the controller further controls the transceiver of the node to receive a status error message sent by the intelligent access point when the intelligent access point is unable to locate the route to the destination after the node has attempted to obtain information pertaining to the route from the intelligent access point.

22. A node as claimed in claim 13, wherein:
the controller further controls the transceiver of the node to send a route request to attempt to locate the route to the destination when the node determines that the destination is a neighboring node within the network.

23. A node as claimed in claim 22, wherein:
the controller further controls the transceiver of the node to refrain from sending a status request message for receipt by the intelligent access point while the node attempts to locate the route to the destination using the route request.

24. A node as claimed in claim 13, wherein:
the controller further controls the transceiver of the node to send a status request message to the intelligent access point to attempt to obtain the information pertaining to the route from the intelligent access point, and operates the node to buffer the packet while awaiting receipt of a status reply or status error message from the intelligent access point in response to the status request message.

25. A node as claimed in claim 13, wherein:
the controller further controls the transceiver of the node to refrain from sending any status request message to the intelligent access point while operating the node to locate the route to the destination.

* * * * *